(12) United States Patent
Yashchuk et al.

(10) Patent No.: US 8,616,044 B2
(45) Date of Patent: Dec. 31, 2013

(54) TEST SURFACES USEFUL FOR CALIBRATION OF SURFACE PROFILOMETERS

(75) Inventors: Valeriy V. Yashchuk, Richmond, CA (US); Wayne R. McKinney, Concord, CA (US); Peter Z. Takacs, Riverhead, NY (US)

(73) Assignees: The Regents of the University of California, Oakland, CA (US); Brookhaven Science Associates, LLC, Upton, NY (US)

( * ) Notice: Subject to any disclaimer, the term of this patent is extended or adjusted under 35 U.S.C. 154(b) by 705 days.

(21) Appl. No.: 12/408,508

(22) Filed: Mar. 20, 2009

(65) Prior Publication Data

US 2010/0037674 A1    Feb. 18, 2010

Related U.S. Application Data

(60) Provisional application No. 61/038,640, filed on Mar. 21, 2008.

(51) Int. Cl.
*G01B 11/30* (2006.01)

(52) U.S. Cl.
USPC .......................................... 73/1.89

(58) Field of Classification Search
USPC .......................................... 73/1.89
See application file for complete search history.

(56) References Cited

U.S. PATENT DOCUMENTS

| | | | | |
|---|---|---|---|---|
| 5,578,745 | A * | 11/1996 | Bayer et al. .................. | 73/1.73 |
| 6,172,379 | B1 * | 1/2001 | Borenstain ..................... | 257/21 |
| 2006/0067788 | A1 * | 3/2006 | Schulz ............................ | 404/19 |
| 2008/0024870 | A1 * | 1/2008 | Bourdelais et al. ........... | 359/613 |

* cited by examiner

*Primary Examiner* — Hezron E Williams
*Assistant Examiner* — Mark A Shabman
(74) *Attorney, Agent, or Firm* — Robin C. Chiang; Lawrence Berkeley; National Laboratory (57) ABSTRACT

The present invention provides for test surfaces and methods for calibration of surface profilometers, including interferometric and atomic force microscopes. Calibration is performed using a specially designed test surface, or the Binary Pseudo-random (BPR) grating (array). Utilizing the BPR grating (array) to measure the power spectral density (PSD) spectrum, the profilometer is calibrated by determining the instrumental modulation transfer function (IMTF).

17 Claims, 4 Drawing Sheets

TEST SURFACES USEFUL FOR CALIBRATION OF SURFACE PROFILOMETERS

CROSS-REFERENCE TO RELATED APPLICATIONS

This application claims priority to U.S. Provisional Patent Application Ser. No. 61/038,640, filed Mar. 21, 2008, which is incorporated by reference herein.

STATEMENT OF GOVERNMENTAL SUPPORT

The invention was made with government support under Contract Nos. DE-AC02-05CH11231 and DE-AC02-98CH10886, both awarded by the United States Department of Energy (DOE). The government has certain rights in the invention.

BACKGROUND OF THE INVENTION

Surface profilometers, such as interferometric microscopes, have become a basic metrology tool for the characterization of high quality optical surfaces with sub-Angstrom rms roughness. For the last few decades, the standard list of output parameters of an interferometric microscope measurement included values of roughness averaged over an area and along a sample line. This was extended to a more rigorous statistical description of the surface topography based on power spectral density (PSD) distributions of the surface height. For example, the measured PSD distributions provide a basis for sophisticated calculations of three-dimensional scattering of x-rays by the optics.

A straightforward transformation of the measured 2D area distribution of the residual surface heights into a 2D PSD distribution always provides spectra with distortion caused by the unknown spatial frequency response of the instrument. The response is characterized by the modulation transfer function (MTF), determining the bandwidth of the instrument. The MTF contains contributions from the instrumental optical system, detector, signal processing, software algorithm, and environmental factors. Generally, these contributions are difficult to account for separately.

The task of designing high performance X-ray optical systems requires the development of sophisticated X-ray scattering calculations based on rigorous information about the optics. One of the most insightful approaches to these calculations is based on the power spectral density (PSD) distribution of the surface height. The major problem of measurement of a PSD distribution with an interferometric and/or atomic force microscope arises due to the unknown Modulation Transfer Function (MTF) of the instruments. The MTF characterizes the perturbation of the PSD distribution at higher spatial frequencies.

BRIEF SUMMARY OF THE INVENTION

The present invention provides a means for calibrating surface profilometers. Such means is achieved through the use of a test surface, wherein the test surface comprises a substrate and a plurality of grooves or indentations pseudo-randomly distributed on the substrate.

The present invention provides for a test surface comprising: (a) a substrate; and (b) a plurality of grooves, wherein the plurality of grooves are distributed in a pseudo-random pattern on the substrate and have an essentially uniform depth, and wherein each groove is essentially parallel to each other groove; whereby the test surface is useful for calibration of surface profilometers.

The present invention further provides for a method of making the test surface comprising: (a) generating a binary maximum-length pseudorandom sequence; (b) providing a substrate; and (c) forming a plurality of grooves into the substrate corresponding to the maximum-length pseudorandom sequence.

The present invention also provides for a method of calibrating surface profilometers using a test surface, wherein the test surface comprises: (a) a substrate; and (b) a plurality of grooves, wherein the plurality of grooves are distributed in a pseudo-random pattern on the substrate and have an essentially uniform depth, and wherein each groove is essentially parallel to each other groove.

The present invention also provides for a method of determining instrumental modular transfer function (IMTF) of surface profilometers comprising: (a) providing a test surface; (b) experimentally measuring a power spectral density distribution using the test surface; (c) theoretically simulating an ideal power spectral density of the test surface; and (d) taking the square root of the ratio of the experimentally measured power spectral density distribution to the theoretically simulated power spectral density to find an IMTF.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION OF THE INVENTION

Before the present invention is described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All publications mentioned herein are incorporated herein by reference to disclose and describe the methods and/or materials in connection with which the publications are cited.

It must be noted that as used herein and in the appended claims, the singular forms "a", "and", and "the" include plural referents unless the context clearly dictates otherwise. Thus, for example, reference to "groove" includes a plurality of such grooves, and so forth.

These and other objects, advantages, and features of the invention will become apparent to those persons skilled in the art upon reading the details of the invention as more fully described below.

The present invention provides for means and methods for calibration of surface profilometers, such as stylus profilometers, optical, interferometric, atomic force microscopes, scanning probe microscopes, as well as optical, extreme ultraviolet (EUV) and x-ray scatterometers. Calibration is performed using a specially designed test surface, also referred to herein as the Binary Pseudo-random (BPR) grating. Utilizing the BPR grating to measure the power spectral density (PSD) spectrum, the profilometer is calibrated by determining the instrumental modulation transfer function (MTF).

The instrumental MTF is evaluated by comparing a PSD distribution measured using a known test surface, the BPR grating, with a corresponding ideal numerically simulated PSD of the test surface. The square root of the ratio of the measured and simulated PSD distributions gives the instrumental MTF of the surface profilometer. Thus, the Binary Pseudo-random (BPR) grating of the present invention provides an effective means to fulfill the calibration need of surface profilometers.

Test Surface—Binary Pseudo-Random Grating

The test surface, or BPR grating, comprises a plurality of grooves (of binary height levels) pseudo-randomly distributed over a substrate, or uniform grid, with an elementary pitch equal to the elementary width of a groove. Each groove has an essentially uniform depth and each groove is essentially parallel to each other groove. The term 'pseudo-random' depicts that the distribution is specially generated to possess a property of randomness in the mathematically strong sense. Thus, pseudo-random means that the distribution appears random but is in fact not. Pseudo-random sequences typically exhibit statistical randomness while being generated by an entirely deterministic causal process. A pseudorandom sequence has spectral characteristics that are mathematically rigorous, reproducible and amenable to simulation, allowing one to deterministically construct a maximum-length random sequence with an ideal ('one-bit' wide) autocorrelation function optimal for a particular instrument.

In some embodiments, the binary pseudo-random distribution of the grooves is generated using a maximum-length pseudorandom sequence (MLPRS). There are three conditions that a sequence must satisfy for it to qualify as a MLPRS. These conditions are: (1) that the sequence recur after $N=2^n-1$ steps, (2) that the autocorrelation of the sequence sum to $2^{n-1}$, and (3) that the cross correlation of the sequence sum to $2^{n-2}$. This property can be referred to as a delta-function-like autocorrelation.

In some embodiments, the generation of maximum-length pseudorandom sequences is developed in connection with the use of pseudorandom chopping of a beam in time-of-flight experiments. The sequences are mathematically represented with 1's, which denote an open chopper slot, and 0's, which denote a closed chopper slot. The chopping associated with a cross-correlation analysis of the measured time-resolved detector signal is favored over single-shot (periodic) chopping with the duty-cycle gain factor as high as N/4 (assuming two slits on a periodic chopper), where N is the length of the pseudorandom sequence.

Similar to the requirement for maximum duty cycle of a pseudorandom chopper, the BPR grating has to be generated with a maximum filling factor for an improved signal-to-noise ratio of the PSD spectra of the test surface. Such sequences used for chopping are not entirely random, repeating themselves after N elements.

In some embodiments, the binary pseudo-random distribution is generated using a binary pseudo-random number sequence generator with a duty cycle smaller than that is for the MLPRS (called also an n-sequence). In some embodiments, the pseudo-random number sequence generator is the Blum Blum Shub, a Mersenne twister algorithm, linear congruential generator, Lagged Fibonacci generator, or inversive congruential generators. In some embodiments, the pseudo-random number sequence can be created using other generators, such as the generators described in U.S. Pat. Nos. 4,047,008 and 4,890,252; hereby incorporated by reference. In some embodiments, bit parity is used to create a binary sequence from a base ten sequence. In some embodiments, a binary pseudo-random sequence is generated using a linear feedback shift register.

The choice of a binary pseudo-random sequence for the test grating has advantages compared with random 1D surfaces based on real random sequences, such as sequences generated by radioactive decay or by white noise sequences obtained with white noise sources. One advantage relates to the requirement of ease of specification and reproducibility of the test surface when used as a certified standard. A binary height distribution with two normalized heights, '1' and '0', can be easily specified for a number of production processes.

In some embodiments, the method of fabricating grooves on the surface is determined based upon requirements for the height, depth or widths of each groove. In some embodiments, lithography is one of the possible technologies that can be used for fabrication of a BPR grating surface. In some embodiments, other technologies can be used for fabrication such as some deposition (coating) technologies, multilayer deposition (coating), ruling with a ruling engine, as well as direct machining if the surface has a groove of very large size. In some embodiments, the BPR grating can be fabricated by ultrasonic and electrical discharge machining, laser, water jet, plasma etching, ion-beam etching, or other micro-fabrication technique. In some embodiments, the BPR grating can be fabricated using micro-electro-mechanical system (MEMS) fabrication techniques and nanofabrication techniques such as scanning-electron-beam lithography. In some embodiments, for high-volume manufacturing, a high-resolution replication technique such as nano-imprint or x-ray lithography can be used.

In some embodiments, the substrate used for the BPR grating is dependent on the fabrication technology used and on type of surface profilometer to be calibrated. In some embodiments, the substrate is silicon, silicon carbide, silicon nitride, glass, metal (e.g. steel, gold, titanium, aluminum, etc.), plastic (e.g. acrylic, a polymer), or any other suitable material with a smooth surface.

In some embodiments, the absolute value of the height, or depth, of each groove is determined based on requirements for a particular application, such as the range of measurable heights of the instrument. The depth of a groove is chosen based on the profilometer parameters such as light wavelength, height resolution and height range of the instrument. For some applications, it can be also useful to have a BPR calibration surface with depth larger than the wavelength of light. For example, the BPR grating groove depth can be ~700 nm, while the light wavelength is 520 nm. This allows the testing of the phase retrieval procedure used with the instrument. Thus, in some embodiments, the depth of each groove is 1 nm to 100 μm.

The absolute value of the width of the grooves would be determined based upon requirements for a particular application. The width of a groove has to be chosen based on the profilometer parameters such as spatial resolution (or Nyquist frequency used for characterization of interferometers, optical interferometric, atomic, and other types of microscopes, and surface profilometers) of an instrument to be calibrated. In some embodiments, as in the case of the Atomic Force Microscope, the resolution is determined by the size of the sensor tip that is usually about 10 nm. In some embodiments, as is the case of some large area interferometers, the resolution can be as low as 10 mm. Thus, in some embodiments, the width of each groove is 1 nm to 10 mm.

In some embodiments, the grooves can be of any suitable shape, but generally the grooves have a rectangular shape. Possible perturbations of the shape of the generally rectangular grooves of a BPR grating would just lead to a slight change of overall amplitude of the flat PSD spectrum (inherent for an ideally fabricated grating) without any noticeable perturbation of its flat spatial frequency dependence for frequencies lower than the frequency corresponding to the characteristic size of a unit groove.

In some embodiments, instead of making the BPRG of a material allowing surface relief, the BPR grating can be made of a material and technology showing a difference in index of refraction or absorption. In some embodiments, the BPR grating can be made of a material and technology showing a difference in physical properties such as magnetic or electric properties, surface potential, or electron work function. Such a BPR grating would be used to calibrate Scanning Probe Microscopes in different scanning modes: magnetic force microscopy, electric force microscopy, scanning capacitance microscopy, scanning spreading resistance microscopy, scanning tunneling microscopy, conductive atomic force microscopy, or lateral force microscopy.

Using the BPR grating, one can experimentally find the instrumental MTF and correct the measured PSD spectra for the MTF. The success of the correction is ensured by the deterministic character of the pseudorandom sequence used to fabricate the BPR grating test surface and, therefore, the possibility to precisely simulate the PSD spectrum inherent for a certain part of the grating.

A property of the BPR grating is that its PSD spectrum is a result of the distribution of the grooves, rather than the groove shape. This determines a low sensitivity of the BPR grating PSD spectrum to the shape perturbation of a groove, which would be seen only at frequencies significantly higher than the Nyquist frequency of the instrument. In any case, if the perturbation is random, it does not change the inherent random (white-noise-like) character of the BPR grating PSD spectrum. Moreover, the overall magnitude of the BPR grating PSD spectrum is determined by the depth of the grooves. Therefore, for a reasonably designed BPR grating standard, the contribution of the roughness of the grating surface can be easily made to be insignificant.

One aspect of the proposed BPR grating, which comes from the spatial frequency independence of its PSD spectrum, is that it basically provides a uniform sensitivity to measurement of the MTF function at all desired frequencies. It also provides a measure of the system MTF averaged over the entire linear extent of the field of view, rather than just in a very localized region around the height discontinuity of a single step artifact.

The deterministic character of the BPR grating allows precise simulation of the theoretical (ideal) PSD spectrum of the standard and comparison of it with an experimentally measured spectrum. But for some applications, the theoretical spectrum can be approximated with an ideal (without variation) white-noise-like spectrum. In this case, the amplitude of fluctuations of the measured PSD spectrum can be significantly decreased by averaging the PSD spectra measured at random shifts of the BPR grating with respect to the field of view of the instrument (compare with FIG. 3). A further reduction in the variance can be obtained if an averaging procedure is applied. (See W. H. Press, S. A. Teukolsky, W. T. Vetterling, B. P. Flannery, "Numerical Recipes in C++" (Second Edition, Cambridge University Press, 2003), pp. 557-558; hereby incorporated by reference for all purposes.) In this case the measured height profiles are divided into a number of shorter length profiles and the PSD spectra of each subset are averaged.

The inherent PSD spectrum of such a grid is independent of spatial frequency (white-noise-like). Therefore, any deviation of a PSD spectrum measured with a real instrument from a white-noise-like spectrum would be a measure of the instrumental MTF.

Two-Dimensional (2D) Test Surfaces

In some embodiments, the present invention is extended to the two-dimensional (2D) case using a test surface with a binary pseudo-random 2D pattern. Such a 2D test surface would have the same advantages compared to a 2D gray random target or other real random arrays, such as arrays generated by radioactive decay or by white noise arrays obtained with white noise sources or generated with a generator of random numbers. One advantage relates to the requirement of ease of specification and reproducibility of the test surface when used as a certified standard. A binary height distribution with two normalized heights, '1' and '0', can be easily specified for a number of production processes. The inherent 2D PSD spectrum of the binary pseudo-random arrays is spatial frequency independent, white-noise-like spectrum. Other advantages include a mathematically deterministic character and ease of specification and reproduction. An additional advantage of the 2D pseudo-random PSD standard would be the possibility for a direct 2D calibration of the instrumental MTF. Further, the suggested calibration method using a BPR grating and/or the extended method based on a 2D pseudo-random test surface meets the requirements of ease of specification and reproducibility of a test surface used as a certified standard.

In some embodiments, the binary pseudo-random distribution of the array elements (pixels) is generated using a uniformly redundant array (URA) (See e.g., A. Busboom, H. Elders-Boll, and H. D. Schotten, "Uniformly redundant arrays," Experimental Astronomy, vol. 8 (1998), pp. 97-123; E. E. Fenimore and T. M. Cannon, "Coded aperture imaging with uniformly redundant arrys," Applied Optics, vol. 17, No. 3, (1978), pp. 337-347; E. Caroli, J. B. Stephen, G. Di Cocco, L. Natalucci, and A. Spizzichino, "Coded aperture imaging in x- and gamma-ray astronomy," Space Science Review, vol. 45, (1987), pp. 349-403; all of which are hereby incorporated by reference). URA's are two-dimensional binary arrays with constant sidelobes of their periodic autocorrelation function. They are widely used as optimum mask patters for coded aperture imaging. Similar to an MLPRS, the periodic autocorrelation function (PACF) for a URA array has one value for a central (0,0) element, and a different but the same value for all other PACF elements (the PACF sidelobes). This property can also be thought of as a 2D delta-function-line PACF.

In some embodiments, the test surface comprises a substrate and a pseudo-random pattern of indentations distributed in a two-dimensional array on the substrate. In some embodiments, the plurality of indentations (e.g. divets or grooves) forms a grid-like pattern. Such a grid-like pattern can be created utilizing the design of the 1D gratings described above. However, instead of having just one plurality of grooves, two or more plurality of grooves can be aligned in rows such that a side-by-side parallel pattern is generated. In some embodiments, the plurality of grooves can be based upon different MLPRS's. In some embodiments, each row can be based upon a single MLPRS, but the starting point for each may be shifted.

In some embodiments, the 2D test surface comprises a plurality of grooves in one axis and a plurality of grooves in a perpendicular axis. The plurality of grooves can be generated using an MLPRS as described above.

EXAMPLES

Example 1

Mathematical Background of Binary Pseudo-Random Grating Standard

The analytical method used to generate a MLPRS (modulo-two) of odd length $N=2^n-1$, where n is an integer, is described in D. D. Koleske, and S. J. Sibener, Generation of pseudorandom sequence for use in cross-correlation modulation, Rev. Sci. Instrum. 63(8), 3852-3855 (1992); hereby incorporated by reference. In that article, all base ten values for the recursion coefficients (RC) which can be used for the generation of MLPRS are presented and the use of a particular RC to generate a pseudorandom sequence is explained.

A sequence $\{a_i\}$ of N elements (i=0, 1, ..., N-1) to be qualified as a MLPRS must obey two conditions on its correlation function. First, the autocorrelation of the sequence must sum to $2^{n-1}$. That means that the sequence's correlation function, which is determined as $$A_j = \sum_{i=0}^{N-1} a_i a_{i+j}, \quad \text{(Equation 1)}$$

$$j = 0, 1, \ldots, N-1,$$

sums to $A_0=2^{n-1}$ (equal to the number of 1's in the MLPRS) at j=0. Second, the sequence has to be 'almost' uncorrelated, which means that the cross-correlation of the sequence, $A_j$ at j≉0 all are equal to each other, $A_j=2^{n-2}$. The conditions are very natural if one uses a definition of a purely random sequence (or process), or white noise, as a sequence which consists entirely of uncorrelated binary elements (impulses).

Note here, that in order to construct a 'true' δ-function-like correlation function [that is δ(j≉0)=0 and δ(j=0)=1] for a particular MLPRS, one can use a specially designed 'deconvolution' sequence $$b_i = \frac{2a_i - 1}{2^{n-1}}. \quad \text{(Equation 2)}$$

Then the expression analogous to Eq. (1) gives the δ-function-like correlation function $$\Delta_j = \sum_{i=0}^{N-1} a_i b_{i+j} = \frac{1}{2^{n-2}} \sum_{i=0}^{N-1} a_i a_{i+j} - 1. \quad \text{(Equation 3)}$$

According to Eq. (3) $\Delta_0=1$ at j=0 and $\Delta_j=0$ at j≉0.

Figure 1:
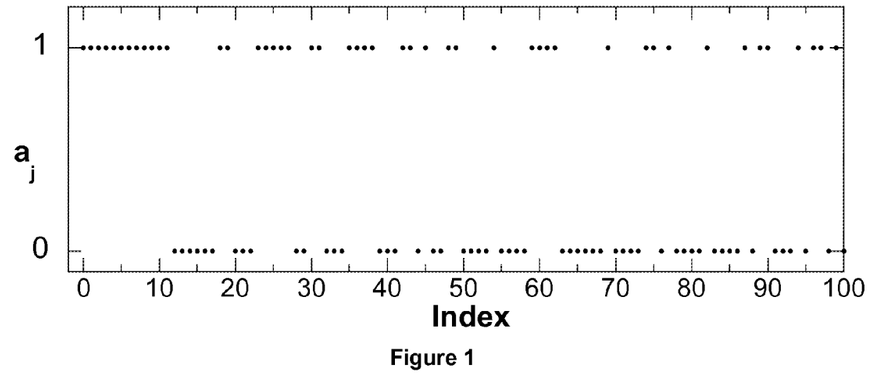
FIG. 1 depicts the first 100 elements of the Binary Pseudo-random (BPR) sequence.

Based on the procedure described in Koleske, and Sibener, Rev. Sci. Instrum. 63(8), 3852-3855 (1992), we generate a BPR sequence of N=4095 elements obtained (see Koleske, and Sibener, Rev. Sci. Instrum. 63(8), 3852-3855 (1992), Table III; hereby incorporated by reference) with sequence generator n=12 and the recursion coefficient M=83 (base 10 value). FIG. 1 graphically reproduces the first 100 elements of the BPR sequence.

Example 2

Prototype of the Test Surface, Binary Pseudo-Random Grating Standard

A test surface or grating according to the generated BPR sequence is fabricated using a conventional lithographical process. The grooves in the grating are etched into a substrate, such as silicon or glass. The fundamental feature width of the grating is 2.5 μm. The etch depth is measured with a calibrated atomic force microscope to be approximately 700 nm. However, the effective depth of the grating as it is seen by the Micromap™-570 interferometric microscope is only 174 nm. The discrepancy is due to the uncertainty of 2π of the phase-retrieval algorithm of the instrument. The uncertainty leads to the effective depth of the grating smaller by the wavelength of the light that is λ=520 nm. Nevertheless, this circumstance does not compromise the possibility to calibrate the instrument with a standard with depth larger than λ, if the 2π phase shift due to the retrieval is applied to the entire surface measured. Moreover, with such a grating, one can test the capability of the instrument to reliably measure surface structures with concavities deeper than the wavelength of light.

Figure 2:
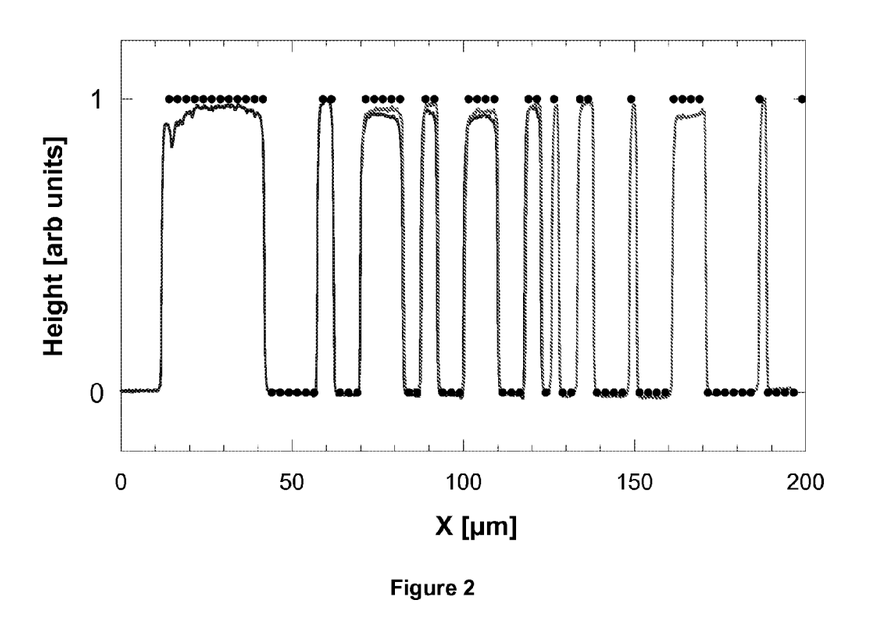
FIG. 2 depicts measured profiles made near the left edge of a prototype BPR grating with a Micromap™-570 interferometric microscope with a 50× objective. Also shown are the corresponding points in the computed BPR function. The measured profiles are inverted to match the polarity of the computed function.

Measurements made near the left (low index number) edge of the grating with the Micromap™-570 interferometric microscope using the 50× objective are shown in FIG. 2, along with the corresponding points of the ideal BPR grating pattern scaled to the 2.5 μm grid pitch.

The field of view on the surface at this magnification for the profile measurement is about 125 μm, which corresponds to 50 feature elements on the grating. The starting points for the two measured profiles are shifted by about 70 μm, which corresponds to 28 grating elements. The measured profiles are inverted to match the polarity of the BPR sequence. One can see that the etching process leaves some residual roughness at the bottom of a groove (at the top of the plotted features in FIG. 2), since it is not yet optimized to produce the desired height and minimum residual roughness. However, since the deviations from the ideal profile are significantly smaller than the grating groove height, there is not a noticeable perturbation of the resulting PSD spectrum of the grating. Moreover, a reasonable assumption about the random character of the perturbations suggests a white-noise-like spectrum of the perturbation that is the desired property of the BPRG test surface.

Figure 3:
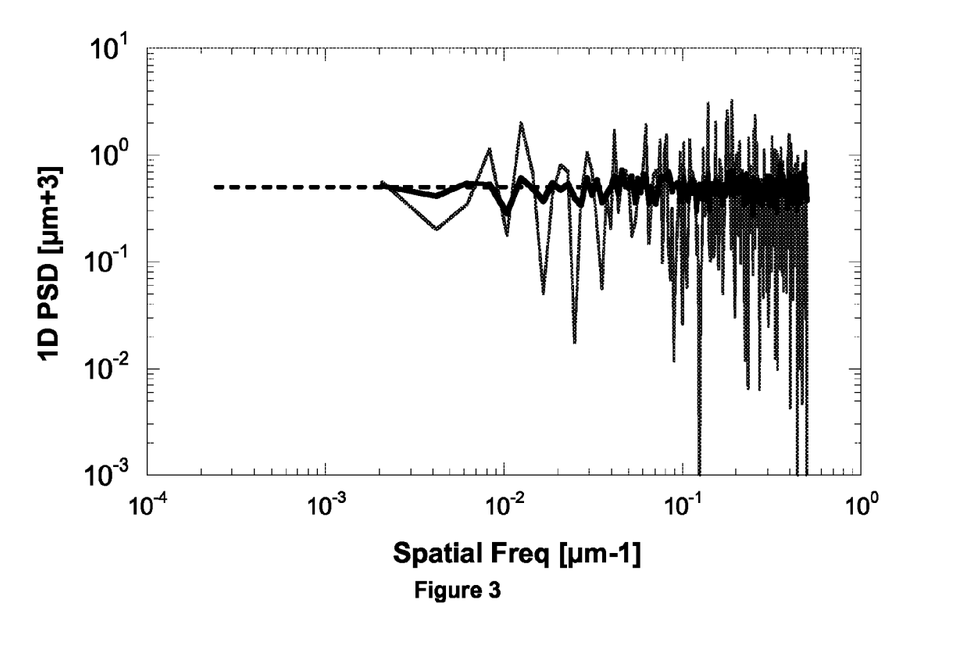
FIG. 3 depicts a 1D PSD spectrum of the ideal unit-height BPR grating function with 4095 total number of pixels placed on a 1 µm pitch grid: dashed straight line includes all 4095 points in the calculation; lighter solid irregular line is from a subset of the first 480 points; darker solid line is average of 9 480-point spectra, each shifted by 400 pixels.

FIG. 3 compares the 1D PSD spectrum of a unit-height 4095-element constructed BPR pattern with an element grid spacing of 1 μm computed over the entire 4095 point set (dashed straight line) with the PSD computed from subsets of the full 4095 element array. The noisy spectrum resulting when only the first 480 points are used in the calculation is shown as the lighter solid curve. The speckle noise is significantly reduced by averaging the spectrum of nine 480-point subsets of the main pattern, each shifted successively by 400 pixels. This latter darker curve corresponds more closely to the general observed case when the grating is viewed by a real microscope system. For the simulation, a discrete PSD algorithm is used and is described in e.g., V. V. Yashchuk, A. D. Franck, S. C. Irick, M. R. Howells, A. A. MacDowell, W. R. McKinney, Two dimensional power spectral density measurements of x-ray optics with the Micromap interferometric microscope, SPIE Proceedings 5858, pp. 58580A-1-12; V. V. Yashchuk, S. C. Trick, E. M. Gullikson, M. R. Howells, A. A. MacDowell, W. R. McKinney, F. Salmassi, T. Warwick, Cross-check of different techniques for two dimensional power spectral density measurements of x-ray optics, SPIE Proceedings 55921, pp. 59210G-1-12; and V. V. Yashchuk, E. M. Gullikson, M. R. Howells, S. C. Irick, A. A. MacDowell, W. R. McKinney, F. Salmassi, T. Warwick, J. P. Metz, T. W. Tonnessen, Surface roughness of stainless-steel mirrors for focusing soft x rays, Applied Optics 45(20), 4833-4842 (2006); all of which are hereby incorporated by reference. The spectrum of the ideal BPRG function is indeed a white-noise-like straight line with no fluctuations and with an amplitude of 0.5. The amplitude corresponds to an expectation value based on the duty cycle of approximately 0.5 of the maximum-length pseudorandom sequence used in the construction.

Figure 4:
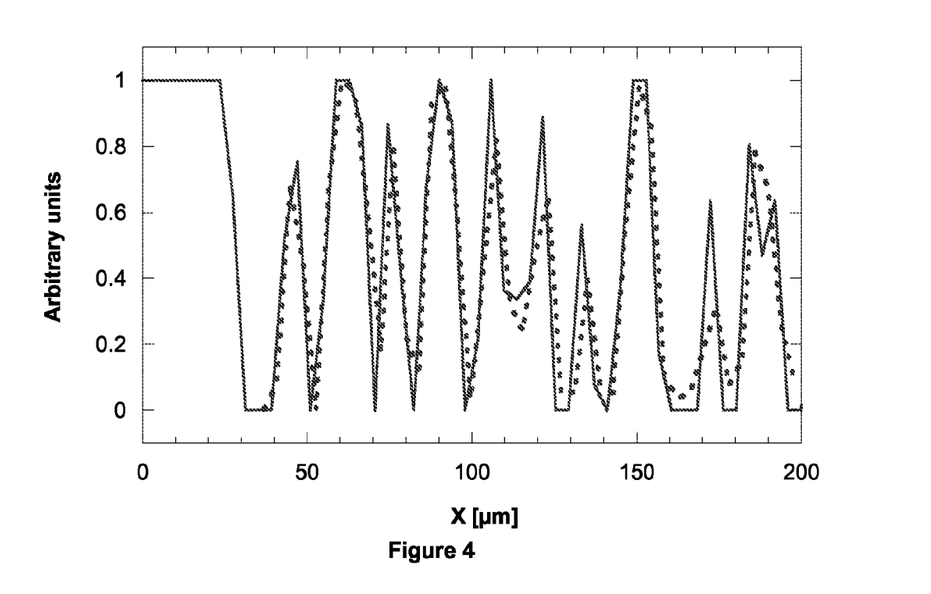
FIG. 4 depicts a profile of the first 200 µm of the 4095 element BPR grating with 2.5 µm pitch: ideal computed function resampled to the 3.92 µm grid (solid curve), and profile measured with the Micromap™-570 microscope with 2.5× objective (dotted curve).

For real experimental arrangements, when an instrument with finite detector pixel size is used, one can not expect the spacing of the grating projected onto the detector to line up exactly with the boundaries of each detector pixel. A situation corresponding to a measurement with the Micromap™-570 microscope with a 2.5× objective is simulated. The total number of detector pixels is 480 and the size of each pixel projected onto the grating is 3.92 μm. In this case, the grating pattern is undersampled and the pixel width encompasses more than one grating element. The simulation was aligned to have the first grating element at the left edge of the profile. The result of the simulation is shown in FIG. 4 together with the BPRG profile measured with the instrument over the same profile length. The corresponding PSD spectra are shown in FIG. 5.

Figure 5:
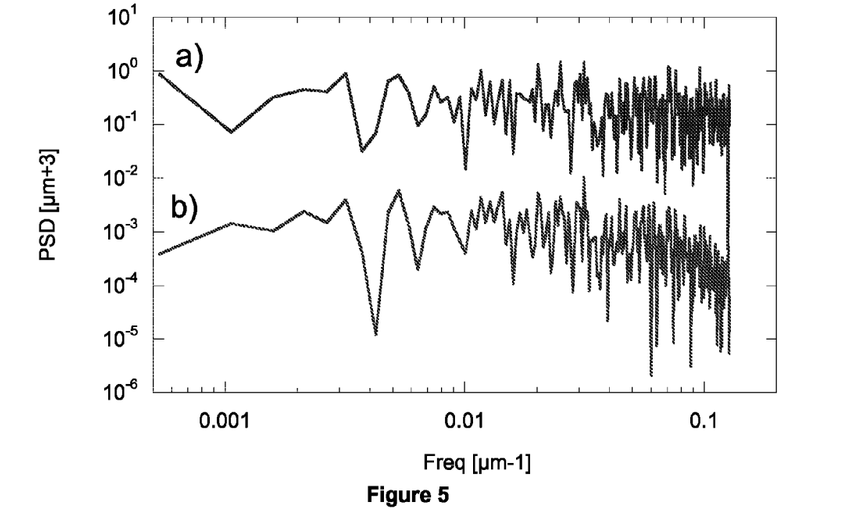
FIG. 5 depicts 1D PSD spectrum of the 4095 element, 2.5-µm pitch, BPR grating: a) (upper) for the model simulation resampled onto a 3.92 µm grid, and b) (lower) for the profile measured with the Micromap™-570 microscope with 2.5× objective. The simulation and measurement fields of view correspond to the 480 pixel row length in the Micromap. Vertical offset of the lower spectrum is made for clarity.

At lower spatial frequencies, the spectra in FIG. 5 are almost identical. That is the result of the deterministic character of the grating profile. The difference, seen for a few points at the lower spatial frequencies, is a result of the detrending with a two-dimensional second-order polynomial subtracted from the measured surface profile.

Example 3

MTF Correction of Micromap™-570

Figure 6:
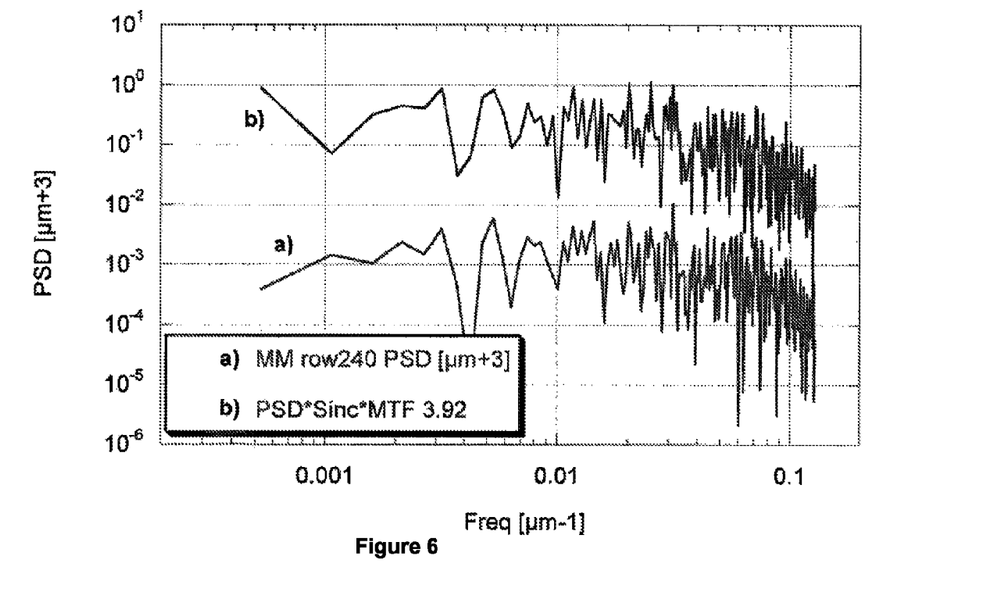
FIG. 6 depicts 1D PSD spectra of the BPRG with 4095 total number of elements with 2.5-µm pitch. The upper spectrum (PSD*Sinc*MTF 3.92) corresponds to the theoretical BPRG PSD shown in FIG. 5a but corrected to account MTF due to the effective pixel size (4) and additionally corrected for the MTF of diffraction limited objective (5). The lower line (MM row240 PSD [µm+3]) depicts the PSD spectrum of the BPR grating standard described in the text. The experimental spectrum was measured with the Micromap™-570 microscope with 2.5× objective. Vertical offset of the lower spectrum is made for clarity.

The high frequency roll-off of the measured spectrum (FIG. 5*b*) is due in part to the instrumental MTF associated with sampling with finite pixels (see, e.g., J. W. Goodman, Introduction to Fourier Optics, third edition (Roberts & Company Publishers, Englewood, 2005; hereby incorporated by reference). This effect can be accounted for with a Sinc-function-like MTF (see V. V. Yashchuk, et al., Two dimensional power spectral density measurements of x-ray optics with the Micromap interferometric microscope, SPIE Proceedings 5858, pp. 58580A-1-12; hereby incorporated by reference)

$$MTF_P(f_x, f_y) = \left(\frac{\operatorname{Sin}\pi D_x f_x}{\pi D_x f_x}\right)\left(\frac{\operatorname{Sin}\pi D_y f_y}{\pi D_y f_y}\right), \quad \text{(Equation 4)}$$

where $f_x$ and $f_y$ are the components of the spatial frequency, and $D_x$ and $D_y$ are the effective pixel sizes projected on to the surface plane. The result of application of the MTF (4) with an optimal effective size of a pixel of ~5.1 μm to the theoretical PSD spectrum (FIG. 5*a*) is shown in FIG. 6*a*. A figure of merit for the optimal correction is a coincidence of the measured BPRG PSD spectrum and the PSD inherent for the BPRG test surface corrected with the MTF (4). The effective size of a pixel (that is approximately 1.35 of size of a pixel of the Micromap™-570 with 2.5× objective) found here with the BPR grating, coincides with the result of indirect calibration of the same instrument described in Yashchuk, et al., SPIE Proceedings 5858, pp. 58580A-1-12; Yashchuk, et al., SPIE Proceedings 55921, pp. 59210G-1-12; and Yashchuk, et al., Applied Optics 45(20), 4833-4842 (2006); hereby incorporated by reference. Note that for PSD correction the MTF function squared is used.

Even better correction can be achieved by additionally adding an incoherent transfer function of a diffraction-limited objective in the form $$MTF_O(f) = \frac{2}{\pi}[-\Omega\sqrt{1-\Omega^2} + \text{ArcCos}\Omega],\quad \text{(Equation 5)}$$

where $\Omega=\lambda f/2NA$, $\lambda$ is the measuring wavelength (0.52 μm), $f=\sqrt{f_x^2+f_y^2}$, and NA is the numerical aperture (0.075 for a 2.5× objective). After the correction, the measured and inherent PSD spectra of the BPRG are almost identical.

Figure 7:
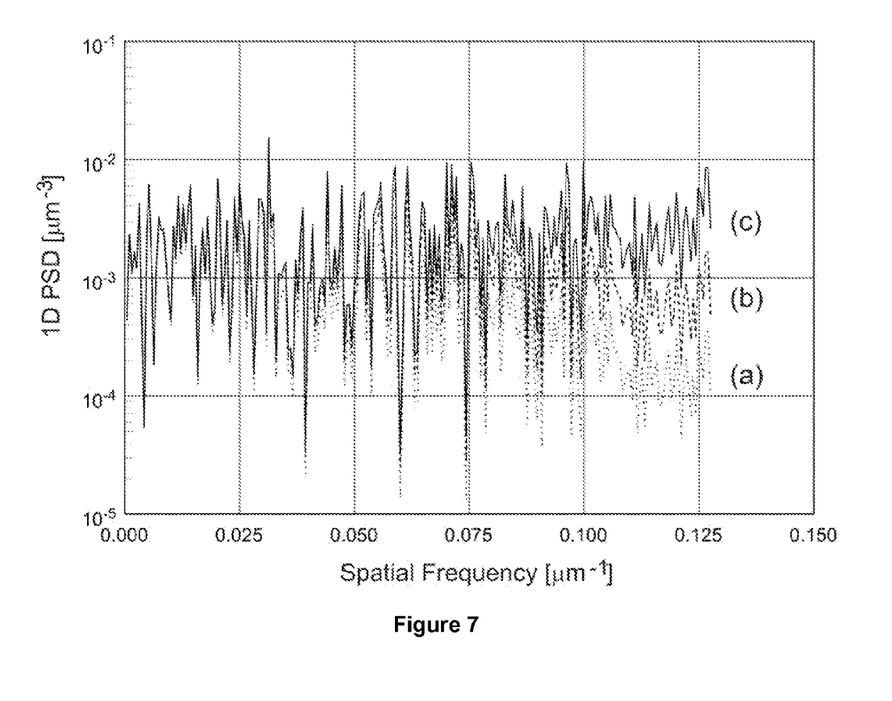
FIG. 7 depicts 1D PSD spectrum of the prototype BPRG with 4095 total number of elements with 2.5-μm pitch measured with the Micromap™-570 microscope with 2.5× objective: a) (lower, dotted line) average uncorrected raw PSD curve; b) (middle, dashed line) corrected to account for MTF due to the objective lens aperture, and c) (upper, solid line) additionally corrected for the MTF of the finite pixel width.

FIG. 7 illustrates the efficiency of the MTF correction applied to the 1D PSD spectrum of the prototype BPRG measured with the Micromap™-570 microscope with 2.5× objective. After correction for the lens MTF, the high frequency tail of the initial spectrum (FIG. 7a) is raised (FIG. 7b) but it is still exhibits significant roll off. The result of applying this correction with an optimal effective pixel size of 5.1 μm to the lens-corrected PSD is shown in FIG. 7c. In this case, the corrected PSD flattens out to a noisy horizontal line, becoming a white-noise-like spectrum, indicating that the applied MTF corrections are sufficient to account for the observed high-frequency roll-off.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

We claim:

1. A test surface comprising:
  (a) a substrate; and
  (b) a plurality of grooves, wherein the plurality of grooves are distributed in a pseudo-random pattern on the substrate and have an essentially uniform depth, and wherein each groove is essentially parallel to each other groove and has a depth of about 1 nm to 100 μm;
  whereby the test surface is configured for calibration of a surface profilometer.

2. The test surface of claim 1, wherein the pseudo-random pattern of the plurality of grooves is a binary pseudo-random distribution of the grooves generated using a maximum-length pseudorandom sequence (MLPRS).

3. The test surface of claim 2, wherein the pseudo-random pattern is generated using a pseudo-random number generator.

4. The test surface of claim 2, wherein the pseudo-random pattern is generated using a maximum-length pseudorandom sequence (MLPRS).

5. The test surface of claim 1, wherein the grooves have an elementary pitch equal to a width of the groove.

6. The test surface of claim 1, wherein the grooves have a width of about 1 nm to 10 mm.

7. The test surface of claim 6, wherein the width of each groove is about 1 nm to 2.5 μm.

8. The test surface of claim 1, wherein the grooves are distributed into the substrate by a technique selected from the group consisting of lithography, etching, machining, deposition, or other suitable means.

9. The test surface of claim 1, wherein the substrate is has a smooth surface.

10. The test surface of claim 1, wherein the substrate is selected from the group consisting of silicon, silicon carbide, silicon nitride, glass, metal, and plastic.

11. The test surface of claim 1, wherein the surface profilometer is a stylus profilometer, optical microscope, interferometric microscope, atomic force microscope, scanning probe microscope, optical scatterometer, extreme ultraviolet (EUV) scatterometer, or x-ray scatterometer.

12. The test surface of claim 1, wherein the depth of each groove is about 1 nm to 700 nm.

13. A method of calibrating surface profilometers using a test surface comprising:
  (a) providing a test surface comprising
    (i) a substrate, and
    (ii) a plurality of grooves, wherein the plurality of grooves are distributed in a pseudo-random pattern on the substrate and have an essentially uniform depth, and wherein each groove is essentially parallel to each other groove; and
  (b) experimentally measuring a power spectral density distribution using the test surface;
  (c) theoretically simulating an ideal power spectral density distribution of the test surface; and
  (d) taking the square root of the ratio of the experimentally measured power spectral density to the theoretically simulated power spectral density to find an instrumental modular transfer function (IMTF).

14. The method of claim 13, wherein the IMTF is evaluated by comparing a power spectral density distribution measured using the test surface with a corresponding ideal numerically simulated power spectral density distribution of the test surface.

15. A method of determining instrumental modular transfer function (IMTF) of surface profilometers comprising:
  (a) providing a test surface comprising
    (i) a substrate, and
    (ii) a plurality of grooves, wherein the plurality of grooves are distributed in a pseudo-random pattern on the substrate and have an essentially uniform depth, and wherein each groove is essentially parallel to each other groove;
  (b) experimentally measuring a power spectral density distribution using the test surface;
  (c) theoretically simulating an ideal power spectral density distribution of the test surface; and
  (d) taking the square root of the ratio of the experimentally measured power spectral density to the theoretically simulated power spectral density to find an IMTF.

16. A test surface comprising:
  (a) a substrate,
  (b) a plurality of indentations, wherein the plurality of indentations are distributed in a pseudo-random pattern on the substrate and have an essentially uniform depth and each indentation has a depth of about 1 nm to 100 μm;
  whereby the test surface is configured for calibration of a surface profilometer.

17. The test surface of claim 16, wherein the pseudo-random pattern of the plurality of indentations is generated using a uniformly redundant array (URA).

* * * * *